United States Patent
Buhmann

(10) Patent No.: US 10,119,813 B2
(45) Date of Patent: Nov. 6, 2018

(54) DEVICE AND METHOD FOR ASCERTAINING A SUITABLE POSITION OF A SENSOR DEVICE

(71) Applicant: Robert Bosch GmbH, Stuttgart (DE)

(72) Inventor: Alexander Buhmann, Reutlingen (DE)

(73) Assignee: Robert Bosch GmbH, Stuttgart (DE)

( * ) Notice: Subject to any disclaimer, the term of this patent is extended or adjusted under 35 U.S.C. 154(b) by 890 days.

(21) Appl. No.: 14/478,829

(22) Filed: Sep. 5, 2014

(65) Prior Publication Data

US 2015/0073747 A1 Mar. 12, 2015

(30) Foreign Application Priority Data

Sep. 6, 2013 (DE) .................. 10 2013 217 824

(51) Int. Cl.
*G01B 21/16* (2006.01)
*G01K 1/14* (2006.01)
*G01D 21/00* (2006.01)

(52) U.S. Cl.
CPC ............ *G01B 21/16* (2013.01); *G01K 1/146* (2013.01); *G01D 21/00* (2013.01)

(58) Field of Classification Search
CPC ......... G01K 1/146; G01B 21/16; G01D 21/00
USPC ................... 702/79, 104, 107, 150
See application file for complete search history.

(56) References Cited

U.S. PATENT DOCUMENTS

| | | | | |
|---|---|---|---|---|
| 6,711,513 B2 * | 3/2004 | Brown | ................... | G01P 3/489 324/392 |
| 8,725,216 B2 * | 5/2014 | Gilbert | ............. | H04M 1/72566 455/41.1 |
| 8,902,049 B2 * | 12/2014 | Fushimi | ............. | H05B 37/0272 340/12.22 |
| 8,904,200 B2 * | 12/2014 | Puschini Pascual | ........................ | G06F 9/5027 713/300 |

FOREIGN PATENT DOCUMENTS

DE  198 54 016  5/2000
JP  09298738 A * 11/1997

* cited by examiner

*Primary Examiner* — Manuel L Barbee
(74) *Attorney, Agent, or Firm* — Norton Rose Fulbright US LLP; Gerard Messina

(57) ABSTRACT

A device for ascertaining a suitable position of a sensor device for detecting a measured variable includes: a detection device for detecting environmental data in a surrounding area of the sensor device; a computing unit for ascertaining the suitable position of the sensor device based on the detected environmental data and the measured variable; and an output device for displaying the ascertained suitable position of the sensor device.

16 Claims, 2 Drawing Sheets

DEVICE AND METHOD FOR ASCERTAINING A SUITABLE POSITION OF A SENSOR DEVICE

BACKGROUND OF THE INVENTION

1. Field of the Invention

The present invention relates to a device and a method for ascertaining a suitable position of a sensor device.

2. Description of the Related Art

The "Internet of Things" has the vision of minimizing the information gap between the real and virtual world. The Internet of things denotes the linkage of unambiguously identifiable physical objects, "things," using a virtual representation in an Internet-similar structure.

In this context, technologies such as sensors and actuators are used for expanding the functionality. Possible functions which may be modeled using the Internet of things are, for example, the monitoring of the temperature distribution of an indoor room. For this purpose, sensors are distributed in the room and the temperature distribution is inferred based on the measuring data. The placement of the sensors is typically random. This therefore generally requires more sensors.

Published German patent application document DE 198 54 016 A1 describes a ventilation system for a building having a control unit for driving a final control element connected to a window.

In the ventilation system described there, the control unit is activated as a function of a control or regulating variable influencing the volume of inlet air, preferably by an output signal of a unit for activating an individual room fan or an outlet air flap.

BRIEF SUMMARY OF THE INVENTION

One idea of the present invention is to provide visual support of a user in the optimal placement of sensor devices by applying augmented reality, abbreviated as AR. A computer-supported augmentation of the perception of reality of the present invention is used on mobile devices.

The core of the present invention is that the user is supported in the placement of the sensor devices interactively, through the use of AR. This permits even technically challenged persons to place the sensor devices optimally for the desired task and consequently also to achieve cost optimization for a desired function.

Furthermore, when the present invention is used, it is possible to ensure that the desired function of the sensor devices of the sensor system is also achieved.

According to one specific embodiment of the present invention, it is provided that the detection device is coupled to a data network and is designed for receiving environmental data via the data network. This makes it possible to use already present data concerning the surrounding area in a cost-effective and rapid manner.

According to another specific embodiment of the present invention, it is provided that the detection device includes a position sensor and is designed for detecting a position of the sensor device. This advantageously makes it possible to detect the position of the sensor device and to calculate the optimal position of the sensor device as well as to ascertain whether the sensor device is already situated at the optimally suitable position.

According to another specific embodiment of the present invention, it is provided that the computing unit is designed for ascertaining a suitable position of the sensor device further with the aid of an optimization function. This advantageously makes it possible to apply an optimization or cost function in a simple and reliable manner, the cost function modeling the fulfillment of the function itself and the communication expense. For example, in the case of a temperature sensor, the suitable position is defined on the one hand by an optimal height of the temperature sensor in the room, for example, 1.80 meters above the floor, and on the other hand by a minimal distance of a wireless communication link to a receiver or to a second sensor device. On the other hand, a preferably uniform distribution of the temperature sensors in the room represents another optimization condition. In the case of a single temperature sensor in the room, a suitable position is the center of the room at a height of 1.80 meters.

According to another specific embodiment of the present invention, it is provided that the optimization function is designed as an energy consumption function with regard to an energy consumption of the sensor device. This advantageously makes it possible to reduce the energy consumption of the sensor device.

According to another specific embodiment of the present invention, it is provided that the computing unit and the output device are further designed for ascertaining and displaying a degree of suitability of an arbitrary position of the sensor device in the surrounding area. This advantageously makes it possible to map the surrounding area of the sensor device and to convey to the user an optimal picture with regard to different, possible positions of the sensor device and their suitability.

According to another specific embodiment of the present invention, it is provided that the output device is further designed for displaying a number of sensor devices needed for detecting the measured variable in the surrounding area. This advantageously makes it possible to implement a sensor system having an optimal number of sensor devices cost-effectively and efficiently.

According to another specific embodiment of the present invention, it is provided that the sensor device is designed as a temperature sensor, a humidity sensor or as a chemical sensor. This advantageously makes it possible for the sensor device to detect different measured variables.

DETAILED DESCRIPTION OF THE INVENTION

Figure 1:
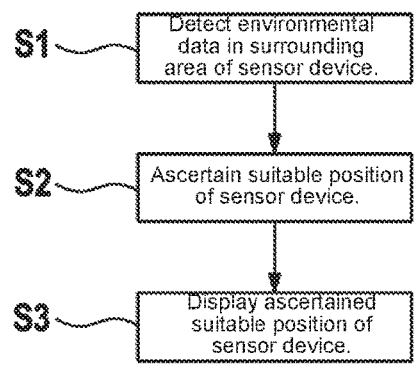
FIG. 1 shows a schematic diagram of a flow chart of a method for ascertaining a suitable position of a sensor device according to one specific embodiment of the present invention.

Identical reference numerals in the figures of the drawings denote identical elements, structural components, components or method steps which are identical or have an identical function, provided nothing to the contrary is indicated. The elements depicted in the drawings are not necessarily shown true to scale in relation to one another.

FIG. 1 shows a schematic diagram of a method for situating at least one sensor device according to one specific embodiment of the present invention.

Detection S1 of environmental data in a surrounding area U of sensor device 1 with the aid of a detection device 2 is carried out as a first method step of the method. Detection S1 may occur within or outside of rooms or areas of surrounding area U.

Detection S1 may be carried by analysis of a recorded camera image, by using other methods for space measurement such as, for example, a laser measurement, or by using map material.

An ascertainment S2 of a suitable position of sensor device 1 based on the detected environmental data and the measured variable detected or to be detected with the aid of a computing unit 3 is carried out as a second method step.

Ascertainment S2 of the ideal sensor positions may be carried out based on the desired function, the spatial or area properties and additional boundary conditions.

A display S3 of the ascertained, suitable position of sensor device 1 is carried out as a third method step with the aid of an output device 4. Display S3 may be carried out by highlighting the ideal positions of sensor device 1 in the AR area of a mobile device.

Furthermore, the user may query a selection of different cost functions for a desired function in one method step.

For example, the following functions may be used as functions of sensor device 1 or sensor system 10: monitoring a temperature distribution in a building, providing fire monitoring in a building, monitoring the air humidity in a building, monitoring water pollution in a waste water or fresh water supply system, detecting a forest fire as well as additional functions.

Furthermore, a ventilation installation of a building may be provided as a function of sensor device 1.

The method steps of the method for situating at least one sensor device may be repeated iteratively or recursively in any sequence. Furthermore, the individual method steps of the method may be arbitrarily combined with one another.

Figure 2:
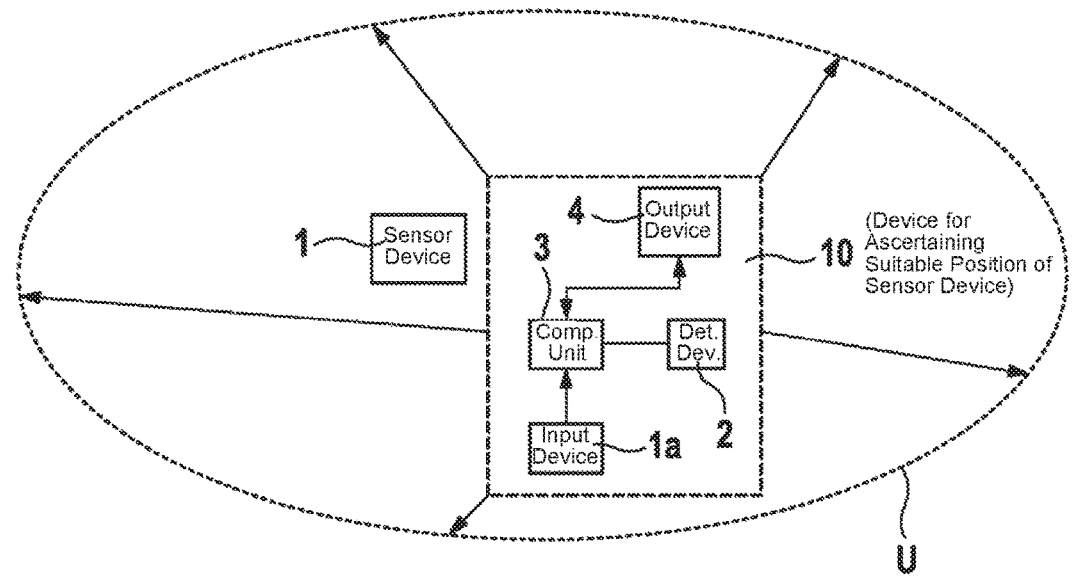
FIG. 2 shows a schematic diagram of a sensor device for detecting a measured variable and a device for ascertaining a suitable position of the sensor device according to another specific embodiment of the present invention.

FIG. 2 shows a schematic diagram of a sensor device for detecting a measured variable and a device for ascertaining a suitable position of the sensor device according to another specific embodiment of the present invention.

A sensor device 1 for detecting the measured variable may include a transducer unit. Sensor device 1 is, for example, designed as an autonomous sensor device, for example, as a monolithic or hybrid sensor chip, and includes an autonomous power supply. In addition to the transducer unit and the power supply, sensor device 1 preferably includes a microprocessor and/or a device for wireless transmission of signals. Preferably, sensor device 1 has a compact size. In particular, the volume of sensor device 1 is smaller than 1 $cm^3$, in particular smaller than 0.5 $cm^3$.

The device for ascertaining a suitable position of sensor device 1 is denoted by reference numeral 10. It includes an input device 1a, a detection device 2, a computing unit 3 and an output device 4. For example, device 10 may be implemented in a mobile telephone or a computer server.

Input device 1a is optional and is used, for example, for defining the sensor type if device 10 is to be suitable for multiple sensor types.

Detection device 2 is designed for detecting environmental data in a surrounding area U of sensor device 1, which is indicated by the arrows in FIG. 2.

For example, sensor device 1 is designed for detecting the room temperature and the transducer unit of sensor device 1 is therefore designed as a temperature sensor; however, detection device 2 is designed as an image sensor for detecting an image of surrounding area U. A device for recording two-dimensional images from light in an electrical or mechanical manner may be used as an image sensor of detection device 2. For example, semiconductor-based image sensors are used, which are able to detect light up to the mid-infrared range.

Based on the detected environmental data and the measured variable, computing unit 3 may be designed for ascertaining a suitable position of sensor device 1. Furthermore, computing unit 3 may also consider an optimization function as well as additional known data parameters of sensor device 1, such as an optimal detection range, when ascertaining the suitable position.

Output device 4 is designed, for example, for displaying the ascertained suitable position of sensor device 1. Output device 4 is, for example, designed as a device for optical signaling of alterable information, states and values, in particular measured variables. For example, output device 4 is designed as a screen, as a display or as a monitor and makes possible a display which is directly visible on sensor device 1.

Furthermore, detection device 2 may be coupled to a data network and be designed for receiving environmental data via the data network. Likewise, detection device 2 may have a position sensor and be designed for detecting a position of sensor device 1.

As a position sensor, a receiver system of a navigation satellite system, for example, the global positioning system, abbreviated as GPS, may be used as a system for position determination.

Furthermore, a plurality of inertial sensors, which allow a measurement of accelerations and rotation rates, may be used for position determination.

Likewise, position data may be requested from the data network connected to the sensor device. For example, the connection of sensor device 1 to the data network is established via an RFID (radio-frequency identification) interface. Such an RFID connection makes automatic identification and localization of objects possible and considerably facilitates the detection of sensor and environmental data.

Computing unit 3 may be designed for ascertaining a suitable position of sensor device 1 further with the aid of an optimization function. An energy consumption function with regard to an energy consumption of sensor device 1 or a cost function of sensor system 10 may be used as an optimization function.

Computing unit 3 is, for example, designed as a processor unit or as another electronic data processing unit and is coupled to output device 4 and detection device 2 in the form of an electronic data processing network.

Alternatively, the optimization calculation or parts of it may also be carried out on an external server device, for example, if the calculation is very complex.

The communication with the server device could, for example, be carried out via GSM or a WLAN.

After an appropriate connection was established, the data, i.e., the environmental data and the sensor data, would be transferred to the server. The cost function or optimization function could either be transferred together with the data or stored in the server device. As a response, the server device would send the positions of the sensors or the evaluation of possible positions of the sensors.

Sensor device 1 may be designed as a temperature sensor, a humidity sensor or a chemical sensor.

An electronic structural component which is capable of converting a temperature into an electrical variable may be used as a temperature sensor. For example, a coulometric humidity sensor or Keidel cell, which measures the water vapor content of the air or the air humidity in a very low concentration, trace humidity, may be used as a humidity sensor.

A gas sensor which is suitable for detecting gaseous substances may be used as a chemical sensor. The gas sensor converts the chemical information in the ambient air into an electrically usable signal.

Figure 3:
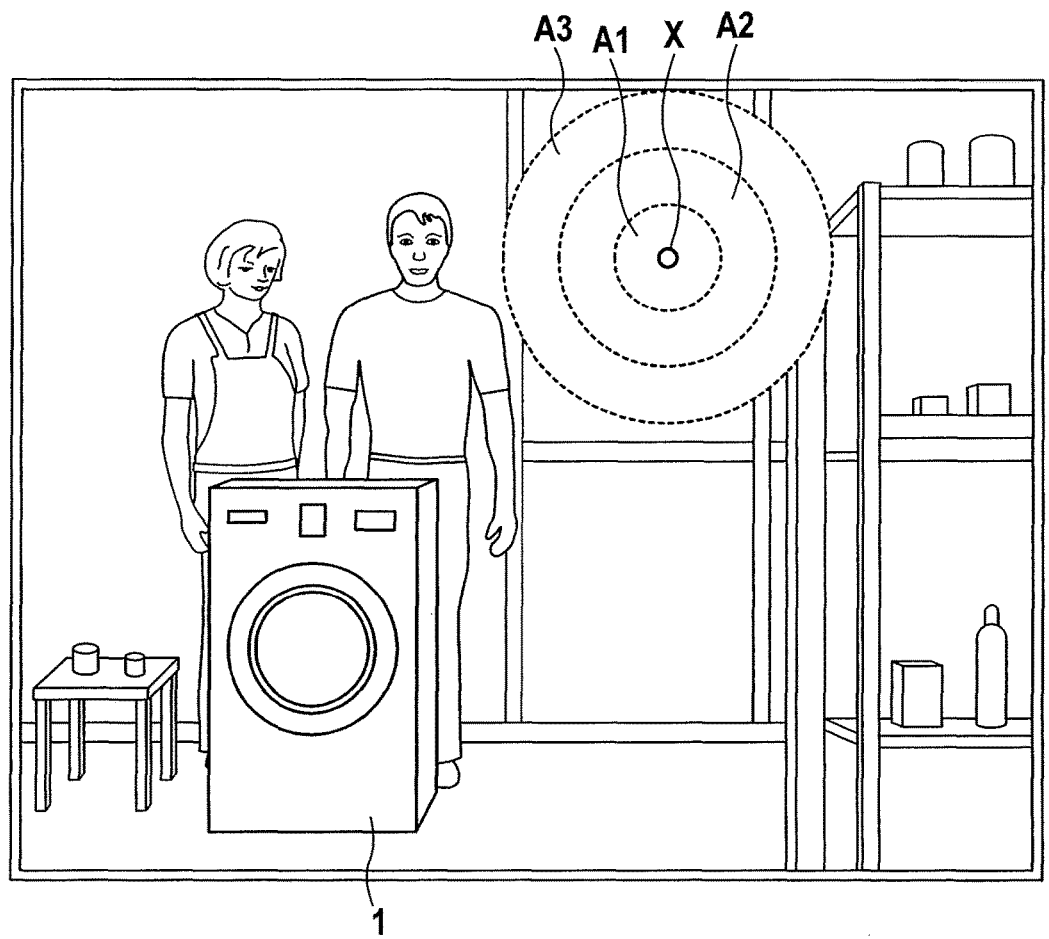
FIG. 3 shows a representation of an image output of the output device according to FIG. 2.

FIG. 3 shows a representation of an image output of the output device and FIG. 2.

Output device 4 displays an image of a surrounding area U of sensor device 1 on a display and further inserts the ascertained suitable position of sensor device 1 into this image as augmented reality in the form of a computer-supported augmentation.

On the one hand, existing sensor devices 1 are displayed and further an optimally suitable location X with regard to a predetermined optimization function is displayed for a sensor device 1 to be added.

Furthermore, a simple evaluation of all possible positions of sensor device 1 to be added are displayed, for example, in color gradations A1, A2, A3 which are not shown.

For example, the area of gradation A1 represents all positions which are in fact less suitable than optimally suitable location X, but nonetheless have a high suitability.

The area having gradation A2 has a lower degree of suitability compared to the positions having gradation A1. Finally, the area having gradation A3 has the lowest degree of suitability and is, in particular, less suitable than the areas having gradations A1 and A2.

Consequently, gradations A1, A2, A3 of the suitability of the location are displayed by output device 4 as a visual representation of information, i.e., as the augmentation of images or videos including computer-generated additional information or virtual objects using insertion/superposition.

Surrounding area U may conform to an area within a maximum distance of, for example, up to 100 m or of up to 10 m or of up to 1 m. Surrounding area U may further be determined for a detection area of detection device 2 or of the transducer unit of sensor device 1.

Although the present invention was described above based on preferred exemplary embodiments, it is not limited thereto, but instead may be modified in a variety of ways. In particular, the present invention may be diversely changed or modified without departing from the core of the present invention.

In particular, the present invention is usable for any types of sensors.

What is claimed is:

1. A mobile device for ascertaining a suitable position to place a sensor device for detecting a measured variable, comprising:
    a detection device for detecting environmental data in a surrounding area of the sensor device, the detection device including an image sensor, the environmental data including an image of the surrounding area;
    a computing unit for ascertaining the suitable position to place the sensor device based at least on the detected environmental data and the detected or to be detected measured variable; and
    an output device including a display for displaying the ascertained suitable position to place the sensor device superimposed on a view of the surrounding area of the sensor device;
    wherein the detection device includes a position sensor detecting a position of the sensor device, the position sensor including a global positioning system ("GPS") receiver system, the computing unit further ascertaining the suitable position to place the sensor device based on position data from the GPS receiver system; and
    wherein the sensor device is one of a temperature sensor, a humidity sensor or a chemical sensor.

2. The mobile device as recited in claim 1, wherein the detection device is (i) coupled to a data network and (ii) receives environmental data via the data network.

3. The mobile device as recited in claim 2, wherein the computing unit ascertains the suitable position to place the sensor device with the aid of an optimization function.

4. The mobile device as recited in claim 3, wherein the optimization function is an energy consumption function with regard to energy consumption of the sensor device.

5. The mobile device as recited in claim 4, wherein the computing unit ascertains, and the output device displays, degrees of suitability of positions to place the sensor device in the surrounding area.

6. The mobile device as recited in claim 5, further comprising:
    an input device for inputting a sensor type.

7. The mobile device as recited in claim 4, wherein the output device displays a plurality of the sensor devices for detecting the measured variable in the surrounding area.

8. The mobile device as recited in claim 3, wherein the sensor device includes the temperature sensor, and the optimization function optimizes a placement height of the temperature sensor and a distance to a wireless communication link of the temperature sensor.

9. The mobile device as recited in claim 1, wherein the sensor device includes the temperature sensor.

10. The mobile device as recited in claim 1, wherein the view of the surrounding area of the sensor device is an image of the surrounding area of the sensor device.

11. A method for ascertaining a suitable position to place a sensor device for detecting a measured variable, comprising:
    detecting, using a detection device of a mobile device, environmental data in a surrounding area of the sensor device, the detection device including an image sensor, the environmental data including an image of the surrounding area;
    ascertaining, using a computing unit, the suitable position to place the sensor device based on the detected environmental data and the detected or to be detected measured variable; and
    displaying, using a display of the mobile device, the ascertained suitable position to place the sensor device superimposed on a view of the surrounding area of the sensor device;
    wherein the detection device includes a position sensor detecting a position of the sensor device, the position sensor including a global positioning system ("GPS") receiver system, the computing unit further ascertaining the suitable position to place the sensor device based on position data from the GPS receiver system; and
    wherein the sensor device is one of a temperature sensor, a humidity sensor or a chemical sensor.

12. The method as recited in claim 11, further comprising:
    placing the sensor device in the ascertained suitable position.

13. The method as recited in claim 11, wherein the view of the surrounding area of the sensor device is an image of the surrounding area of the sensor device.

14. The method as recited in claim 11, wherein the sensor device includes the temperature sensor.

15. The method as recited in claim 11, wherein the computing unit ascertains the suitable position to place the sensor device with the aid of an optimization function.

16. The method as recited in claim 15, wherein the sensor device is includes the temperature sensor, and the optimization function optimizes a placement height of the temperature sensor and a distance to a wireless communication link of the temperature sensor.

* * * * *